(12) United States Patent
Castel et al.

(10) Patent No.: US 6,623,048 B2
(45) Date of Patent: Sep. 23, 2003

(54) APPARATUS AND METHOD OF ATTACHING A TUBE MEMBER TO A HOUSING OF A VACUUM BRAKE BOOSTER

(75) Inventors: Philippe Georges Castel, Paris (FR); Michael William Fanelli, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 24 days.

(21) Appl. No.: 09/859,808

(22) Filed: May 17, 2001

(65) Prior Publication Data

US 2002/0171239 A1 Nov. 21, 2002

(51) Int. Cl.$^7$ ................................................ F16L 13/14
(52) U.S. Cl. ...................... 285/382; 285/20; 285/382.4; 285/382.5; 91/376 R
(58) Field of Search .............................. 285/19, 20, 31, 285/382, 382.4, 382.5; 91/376 R

(56) References Cited

U.S. PATENT DOCUMENTS

| 66,435 | A | * | 7/1867 | Wineman | 285/55 |
|---|---|---|---|---|---|
| 804,590 | A | * | 11/1905 | Ervin et al. | 285/19 |
| 1,960,557 | A | * | 5/1934 | Snyder | 285/179 |
| 2,695,446 | A | * | 11/1954 | Meyer | 29/523 |
| 3,140,540 | A | * | 7/1964 | Greenman | 29/512 |
| 3,283,402 | A | * | 11/1966 | Larson | 29/512 |
| 3,754,731 | A | * | 8/1973 | Mackal et al. | 251/145 |
| 3,787,945 | A | * | 1/1974 | Pasek et al. | 29/890.044 |
| 4,698,896 | A | * | 10/1987 | Osterwald et al. | 29/523 |
| 4,929,001 | A | * | 5/1990 | Phillips, II | 285/141.1 |
| 5,090,298 | A | | 2/1992 | Gautier et al. | |
| 5,170,552 | A | * | 12/1992 | Swiderski et al. | 29/523 |
| 5,213,378 | A | * | 5/1993 | MacGregor | 285/141.1 |
| 5,389,951 | A | * | 2/1995 | Baker | 345/174 |
| 5,411,299 | A | * | 5/1995 | Wagner | 285/189 |
| 5,447,030 | A | * | 9/1995 | Wang et al. | 60/552 |
| 5,593,279 | A | * | 1/1997 | Hayashi | 415/213.1 |
| 6,050,174 | A | * | 4/2000 | Schonlau et al. | 92/169.3 |
| 6,189,437 | B1 | * | 2/2001 | Morlan | 92/165 PR |
| 6,453,794 | B2 | * | 9/2002 | Castel et al. | 91/376 R |

FOREIGN PATENT DOCUMENTS

| DE | 33 28 913 A1 | * | 2/1985 | ................ 285/382 |
|---|---|---|---|---|
| EP | 0 331 535 A1 | | 9/1989 | |
| EP | 0 331 535 B1 | | 8/1991 | |
| EP | 0 623 081 B1 | | 9/1995 | |
| GB | 2 211 573 A | * | 7/1989 | ................ 285/382 |

* cited by examiner

Primary Examiner—Lynne H. Browne
Assistant Examiner—James M. Hewitt
(74) Attorney, Agent, or Firm—Robert M. Sigler

(57) ABSTRACT

An apparatus and method for attaching a tube member to a housing of a vacuum brake booster is provided. A tube member includes a body portion, an outer surface, a first end, and a second end. A first collar portion is disposed between the first end and the body portion, and extends outward from the outer surface. A lip portion is disposed at the first end and extends outward from the outer surface. The first collar portion and the lip portion define a recess to receive a first housing member. The tube member may further include a second collar portion spaced apart from the first collar portion and extending outward from the outer surface. The second collar portion may preferably define a contact surface for contacting an inner surface of a second housing member.

22 Claims, 7 Drawing Sheets

APPARATUS AND METHOD OF ATTACHING A TUBE MEMBER TO A HOUSING OF A VACUUM BRAKE BOOSTER

TECHNICAL FIELD

This invention relates generally to the field of vacuum brake boosters for cars or light trucks, and in particular, to an apparatus and method of attaching a tube member to a housing of a vacuum brake booster.

BACKGROUND OF THE INVENTION

Vacuum brake boosters are typically used in automobiles and light trucks. They typically include a housing that includes a front side and a rear side. The rear side is attached to the firewall of the vehicle, while the front side provides an attachment for a master-cylinder.

Screws or tie-rods are commonly used to attach the booster to the firewall. They are typically crimped or welded to the inner side of the rear shell of the booster housing. The booster is presented to the firewall, and the screws or tie-rods (there are usually 4 screws or 2 tie-rods) are inserted through holes in the firewall. An operator then positions nuts on the other side of the wall (i.e. the driver's compartment) and installs them on the screws or tie-rods. Although this is a widely used process, it involves two operators, one on each side of the firewall, and results in increased costs.

Another process for attaching a booster to a firewall of a housing involves only one operator. This process uses rigid tubular members that extend through the front side of the housing, through the interior of the booster and through the rear of the housing. Fastening bolts can then be inserted into the tubular members to allow the booster to be attached to the firewall. In this scenario, the nut is typically welded onto the firewall.

Various attempts have been made to attach such tubular members to the housing of vacuum brake boosters. An example of a conventional arrangement is described in EP 0 623 081 and shown generally in FIG. 10. As shown in FIG. 10, at least four parts are required, namely, a tubular member 100, a fitting 102, a nut 104 and a seal 106. One end 108 of tubular member 100 is connected and sealed to the front side 110 of a housing 112 via fitting 102 by slightly deforming the metal structure of fitting 102. That is, end 108 of tubular member 100 is crimped against fitting 102, which itself is crimped against the front side 110 of housing 112. The nut 104 and seal 106 are positioned adjacent an inner surface 114 of a back side 116 of housing 112. Nut 104 and seal 106 facilitate the connection and sealing of a second end 118 of the tubular member 100 to the back side 116 of housing 112. The seal is typically obtained by applying glue to a portion of a thread 109, which constitutes an additional step in the process and results in additional costs.

There are several disadvantages to this arrangement, including the large number of parts required (i.e. fitting 102, nut 104, seal 106, and tubular member 100). In addition to the steps required for sealing, the large number of parts increases the costs associated with the vacuum brake booster. Moreover, the installation of these parts is a labor intensive and time-consuming process, which also increases the costs associated with installing the booster.

Another example of a conventional apparatus is shown in FIG. 11. As shown in FIG. 11, a tubular member 200 consists of a first tube portion 202 and a second tube portion 204. The first tube portion 202 is linked mechanically to a rear housing 206 and the second tube portion 204 is linked mechanically to a front housing 208. A bolt 210 may extend through tubular member 200 from the front housing 208 to the rear housing 206. A flange 212 positioned adjacent to an end of bolt 210 prevents the master-cylinder from compressing the booster. EP 0 331 535, for example, discloses a similar arrangement for providing a tubular member in a vacuum brake booster.

There are also several disadvantages to this arrangement. For example, it is very impractical and difficult to manufacture and assemble the first and second tube portions 202, 204 so that they are a part of the housings 206, 208, respectively. This arrangement is also likely to require additional parts. The large number of parts required and the complexity of the interconnections between parts result in increased costs.

In addition to the above, attempts have been made to install metal tubes, studs, etc. onto a planar metal sheet by deforming the metal tube. Although this method of fastening materials together is well known, and is used in many other applications, it has not yet been applied to the manufacture and installation of vacuum brake boosters. In particular, this technique has not yet been utilized to address the problems associated with attaching tube member to a housing of a vacuum brake booster.

Accordingly, it would be desirable to have an apparatus and method of attaching a tube member to a housing of a vacuum brake booster that overcomes the disadvantages described.

SUMMARY OF THE INVENTION

One aspect of the invention provides a connector apparatus for attaching to a housing of a vacuum brake booster. A tube member includes a body portion, an outer surface, a first end, and a second end. A first collar portion is formed between the first end and the body portion and extends outward from the outer surface. A lip portion is formed at the first end and extends outward from the outer surface. The first collar portion and the lip portion define a recess to receive a first housing member. The first collar portion may preferably be adjacent to the first end of the tube member. The first collar portion may preferably include a body portion that extends outward from the outer surface in a direction towards the first end. The first collar portion may preferably have a conical shape. The tube member may further include a second collar portion spaced apart from the first collar portion. The second collar portion may preferably extend outward from the outer surface and may define a contact surface for contacting an inner surface of a second housing member. The second collar portion may preferably extend outward substantially perpendicular from the outer surface of the tube member.

Another aspect of the invention provides a method of attaching a tube member to a housing of a vacuum brake booster. A first housing member including an inner surface, an outer surface, and an opening formed therein is provided. A tube member including an outer surface, a first end, a first portion, and a body portion is also provided. The first portion of the tube member is positioned between the first end and the body portion. The first end of the tube member is inserted through the opening in the first housing member. A force is applied to the first end of the tube member. The first portion is deformed to create a first collar portion extending outward from the outer surface. The first collar portion is contacted against the inner surface of the first housing member. A second force is applied to the first end of the tube member.

An end portion of the first portion is deformed to create a lip portion extending outward from the outer surface. The lip portion is contacted against the outer surface of the first housing member to create a seal between the first housing member and the tube member. The first collar portion may preferably be located adjacent to the first end of the tube member and may preferably include a body portion that extends outward from the outer surface in a direction towards the first housing member. The first collar portion may preferably have a conical shape. The first portion may preferably include a first wall thickness and the body portion may preferably include a second wall thickness, the first wall thickness being less than the second wall thickness. The first housing member may preferably include a flange portion, and the first collar portion may be contacted against the flange portion. The lip portion may preferably be contacted against the flange portion. The flange portion may preferably be angled with respect to the first housing member, and the first housing member may preferably be a planar member. The tube member may further include a third portion that is disposed between the body portion and a second end of the tube member. The third portion may preferably be deformed to create a second collar portion that extends outward from the outer surface. The second collar portion may preferably be contacted against a second housing member to create a seal between the tube member and the second housing member. The second housing member may preferably include an inner surface, and the second collar portion may preferably be contacted against the inner surface of the second housing member. The body portion may preferably include a second wall thickness and the third portion may preferably include a third wall thickness. The third wall thickness may preferably be less than the second wall thickness. The second collar portion may preferably extend outward substantially perpendicular from the outer surface of the tube member.

Another aspect of the invention provides a connector apparatus for attaching to a housing of a vacuum brake booster. A tube member includes a body portion, an outer surface, a first end, and a first portion for creating a collar portion extending outward from the outer surface. The first portion is disposed between the first end and the body portion. The first portion includes an end portion for creating a lip portion extending outward from the outer surface. The collar portion may preferably be adjacent to the first end of the tube member. The first portion may preferably include a first wall thickness and the body portion may preferably include a second wall thickness. The first wall thickness may preferably be less than the second wall thickness. The tube member may further include a third portion for creating a second collar portion that extends outward from the outer surface. The third portion may preferably be disposed between the body portion and a second end of the tube member. The body portion may preferably include a second wall thickness, and the third portion may preferably include a third wall thickness. The third wall thickness may preferably be less than the second wall thickness.

Another aspect of the invention provides a vacuum brake booster including a housing member having an outer surface and an opening formed therein. The housing member includes a flange portion surrounding the opening. A tube member includes a body portion, an outer surface, a first end, and a second end. A first collar portion is formed between the first end and the body portion, and extends outward from the outer surface of the tube member. A lip portion is formed at the first end and extends outward from the outer surface of the tube member. The first collar portion and the lip portion define a recess receiving the flange portion of the housing member. The lip portion may preferably lie in a plane of the outer surface of the housing member that is adjacent to the flange portion. The flange portion may preferably be bent inward from the outer surface of the housing member. The inner surface of the lip portion may preferably contact the flange portion. An outer surface of the lip portion may preferably be flush with the outer surface of the housing member.

DESCRIPTION OF THE PREFERRED EMBODIMENT

Figure 1:
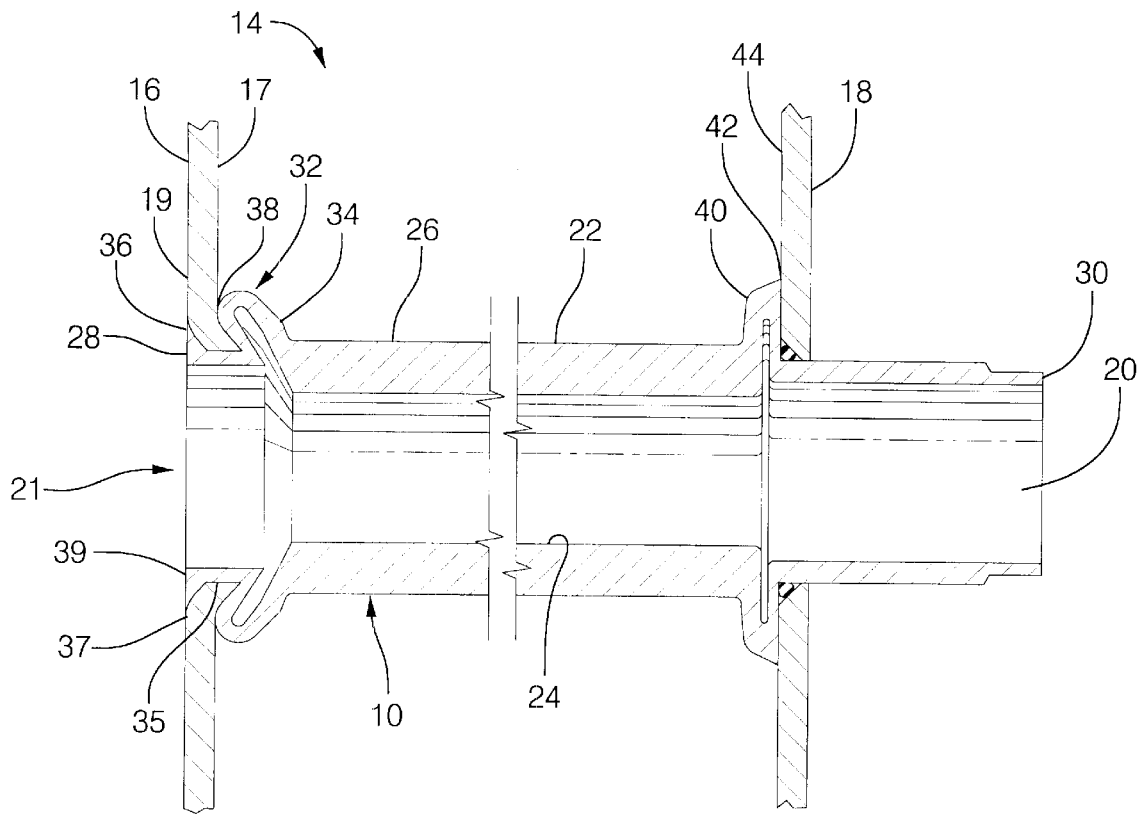
FIG. 1 is a sectional view of a preferred embodiment of a connector apparatus for attaching to a housing of a vacuum brake booster that is made in accordance with the invention.

FIG. 1 is a sectional view of a connector apparatus for attachment to a housing of a vacuum brake booster. A tube member 10 extends through a housing 14 of a vacuum brake booster 11. Housing 14 is preferably made of a metal such as steel as known in the art and comprises a first housing member 16 (or back housing member) and a second housing member 18 (or front housing member). In the embodiment shown, the first and second housing members 16, 18 may each preferably be generally planar members. Although the housing 14 disclosed herein is referenced as a housing for a vacuum brake booster 11, it should be understood by those of ordinary skill in the art that the apparatus and method described herein may be used to attach a tube member 10 to a wide variety of other types of housings. In the embodiment shown in FIG. 1, the first housing member 16 includes an inner surface 17, an outer surface 19, and an opening 21 formed therein.

As shown in FIG. 1, the tube member 10 is an elongated member that extends from the first housing member 16 to the second housing member 18. The tube member provides a passageway 20 to allow a bolt 13 (see FIG. 9) to pass through the housing 14 and extend from second housing member 18 to the first housing member 16. The first housing 16 may then be fixedly attached to a firewall 15 (see FIG. 9) of a car or light truck. The tube member 10 referenced herein may preferably be any hollow member, and may be comprised of any suitable rigid material such as, for example, steel or aluminum.

Tube member 10 includes a body portion 22, an inner surface 24, an outer surface 26, a first end 28 and a second end 30. A first collar portion 32 is formed adjacent the first end 28, extends outward from the outer surface 26 of the tube member 10, and contacts the inner surface 17 of first housing member 16. First collar portion 32 is located between the first end 28 and body portion 22. The distance between first collar portion 32 and the first end 28 of the tube member 10 may vary depending upon the thickness of the first housing member 16 and other factors. For example, the distance between the first collar portion 32 and the first end 28 of the tube member 10 will increase if the thickness of the first housing member 16 increases. Conversely, the distance between the first collar portion 32 and the first end 28 of the tube member 10 will decease if the thickness of the first housing member 16 decreases.

First collar portion 32 may preferably include a body portion 34. The body portion 34 of first collar portion 32 may preferably extend outward from the outer surface 26 of the tube member 10 and slant toward the first end 28 of the tube member 10. In the embodiment shown, for example, body portion 34 helps give the first collar portion 32 a conical shape, although other shapes and configurations are contemplated.

As shown in FIG. 1, a lip portion 36 is formed at the first end 28 of tube member 10. Lip portion 36 extends radially outward from the outer surface 26 of the tube member 10. Lip portion 36 contacts first housing member 16 and ensures that first housing member 16 remains in contact with first collar portion 32. In particular, first housing member 16 includes a flange portion 35 surrounding opening 21 formed in the first housing member 16, and lip portion 36 contacts the flange portion 35. As shown, an inner surface 37 of lip portion 36 contacts the flange portion 35. Flange portion 35 may preferably be bent inward from the outer surface 19 of first housing member 16. First collar portion 32 and lip portion 36 define a recess 38 for receiving the housing member 16. The size and configuration of lip portion 36 may vary depending on the particular application. Moreover, the size and configuration of recess 38 may also vary depending upon the particular application.

As shown in FIG. 1, lip portion 36 lies in the same plane as the outer surface 19 of first housing member 16. In particular, an outer surface 39 of lip portion 36 is flush with the outer surface 19 of first housing member 16. The advantage of this arrangement is that the first housing member 16 can be mounted flush to the firewall 16 (see FIG. 9) so that any loading on the housing 14 is spread over a large area.

As shown in FIG. 1, tube member 10 may preferably also include a second collar portion 40 spaced apart from the first collar portion 32 and extending outward from the outer surface 26 of tube member 10. The distance between the second collar portion 40 and the first collar portion 32 may vary depending upon the distance between the first housing member 16 and the second housing member 18. The second collar portion 40 may preferably define a contact surface 42 for contacting an inner surface 44 of second housing member 18. In the embodiment shown, second collar portion 40 extends outward substantially perpendicularly from the outer surface 26 of tube member 10. Alternatively, the second collar portion 40 may extend outward from outer surface 26 in a direction towards the second end 30 of tube member 10.

Figure 2:
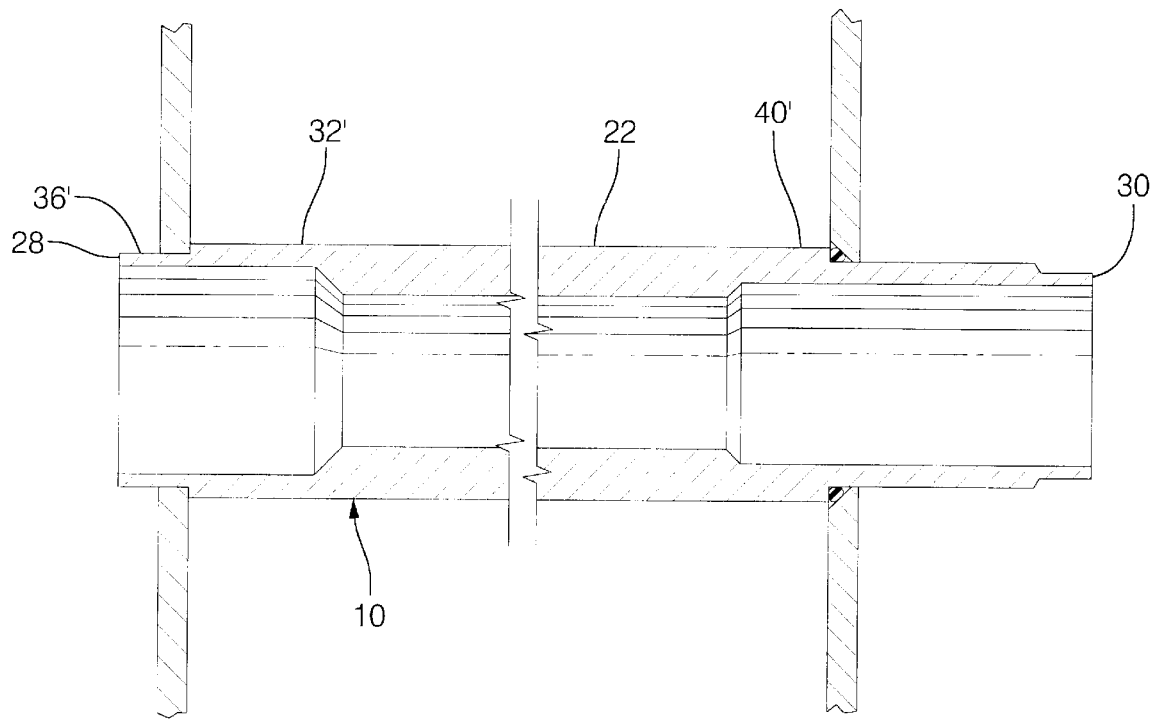
FIG. 2 shows the tube member of FIG. 1 prior to the formation of the first and second collars and the lip portion.

FIG. 2 shows the tube member 10 of FIG. 1 prior to the formation of first and second collar portions 32, 40 and lip portion 36. As shown in FIG. 2, a first portion 32', which is deformed to create the first collar portion 32, is located between the first end 28 of tube member 10 and body portion 22. First portion 32'may also include an end portion 36', which is deformed to create the lip portion 36. A third portion 40', which may be deformed to create the second collar portion 40, may preferably be located between the body portion 22 and the second end 30 of the tube member 10. In the embodiment shown, for example, the first portion 32'may preferably include a first wall thickness; and the body portion 22 may preferably include a second wall thickness which may preferably be greater than the first wall thickness. The third portion 40'may preferably include a third wall thickness, which may preferably be less than the second wall thickness. In the embodiment shown in FIG. 2, the wall thickness of the first portion 32'and the wall thickness of the third portion 40'are the same.

Figure 3:
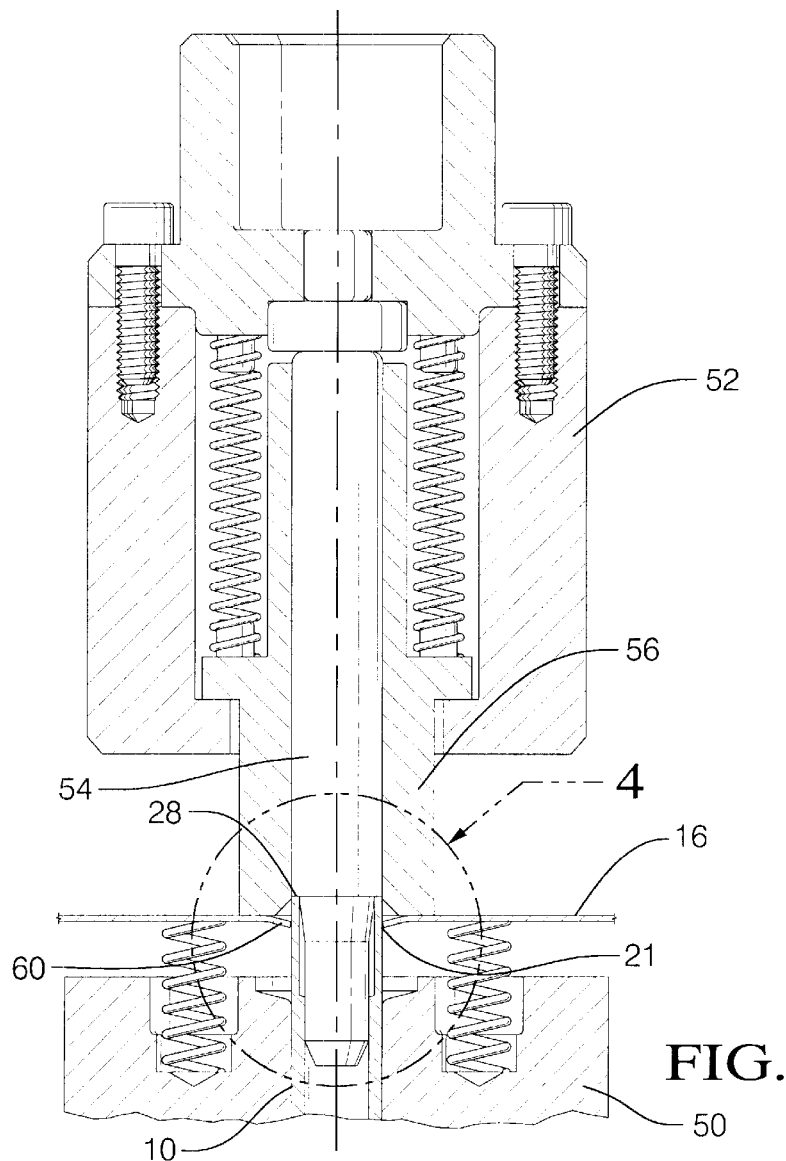
FIG. 3 is a sectional view showing a portion of the tube member of FIG. 2 positioned between a punch apparatus and a die block prior to being deformed by the punch apparatus.
Figure 4:
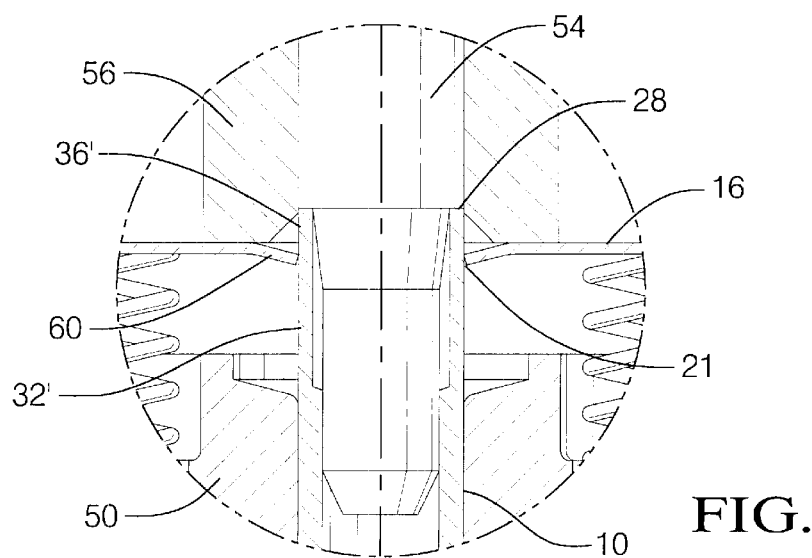
FIG. 4 is an enlarged view of the circled region A shown in FIG. 3.

FIGS. 3–8 illustrate a method of attaching tube member 10 (shown in FIG. 2) to housing 14 (shown in FIG. 1). In particular, FIGS. 3–8 illustrate the attachment of the tube member 10 to the first housing member 16. As shown in FIGS. 3–4, the first end 28 of the tube member 10 is inserted through opening 21 in first housing member 16. A conventional die block 50 may preferably retain the tube member 10. A punch apparatus 52 may preferably be aligned with the die block 50. The punch apparatus 52 may preferably include an inner punch 54 and an outer punch 56. As shown in FIGS. 3–4, inner punch 54 may preferably be aligned with the first end 28 of tube member 10.

Figure 5:
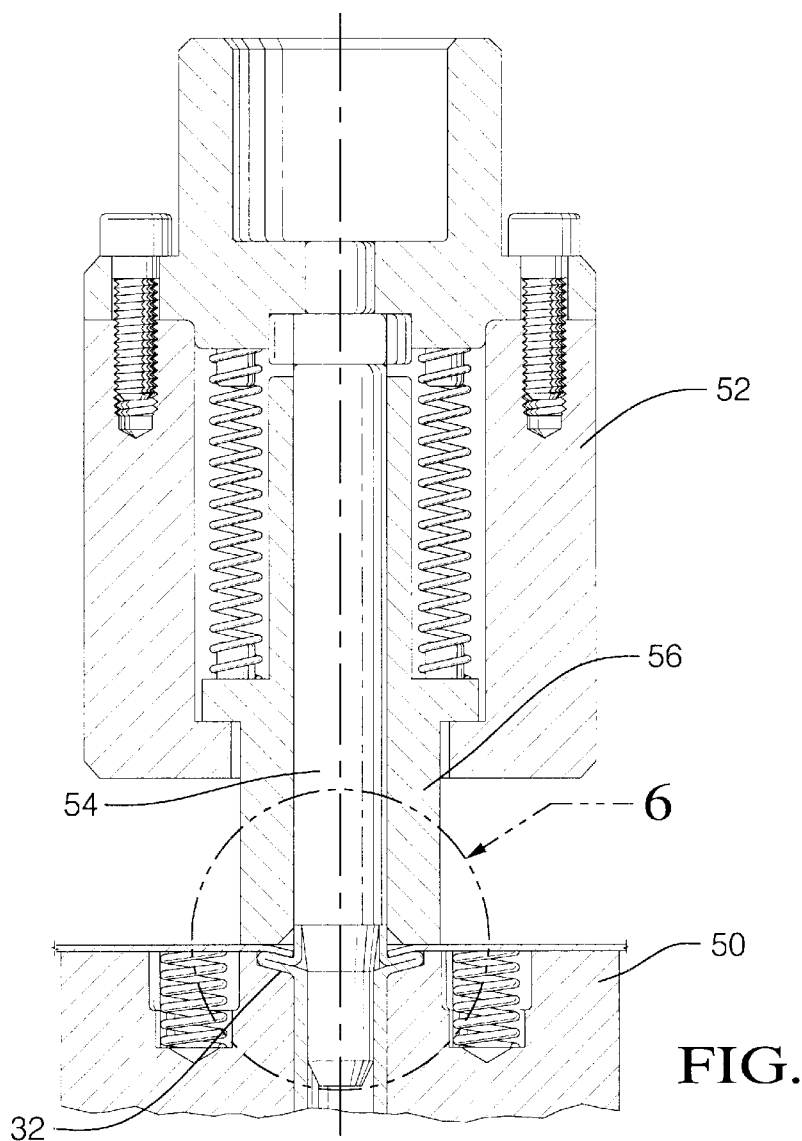
FIG. 5 is the embodiment of FIG. 3 showing the formation of the first collar portion by the punch apparatus.
Figure 6:
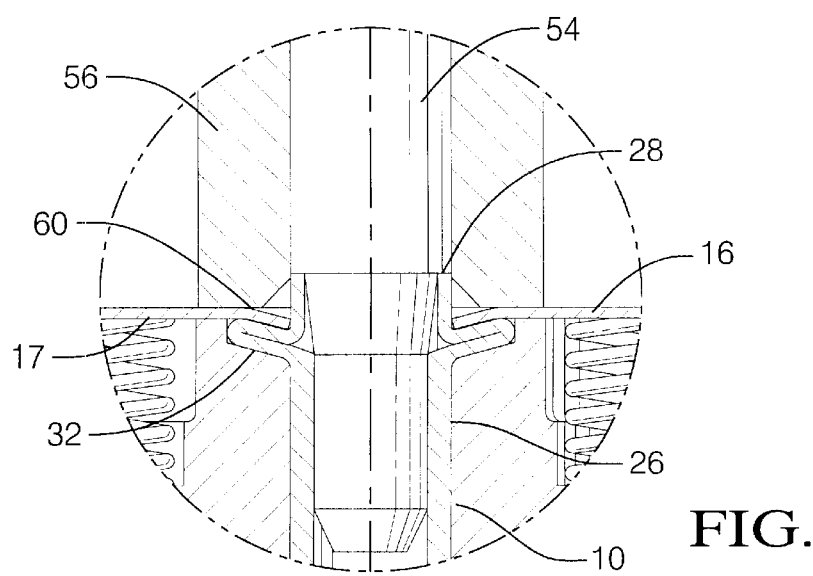
FIG. 6 is an enlarged view of the circled region B shown in FIG. 5.

As shown in FIGS. 5–6, a force is applied to the first end 28 of the tube member 10 by the inner punch 54. The first portion 32' (see FIG. 4) of the tube member 10 is thereby deformed to create the first collar portion 32, which extends outward from the outer surface 26 of the tube member 10. The first collar portion 32 contacts against the inner surface 17 of the first housing member 16.

Figure 7:
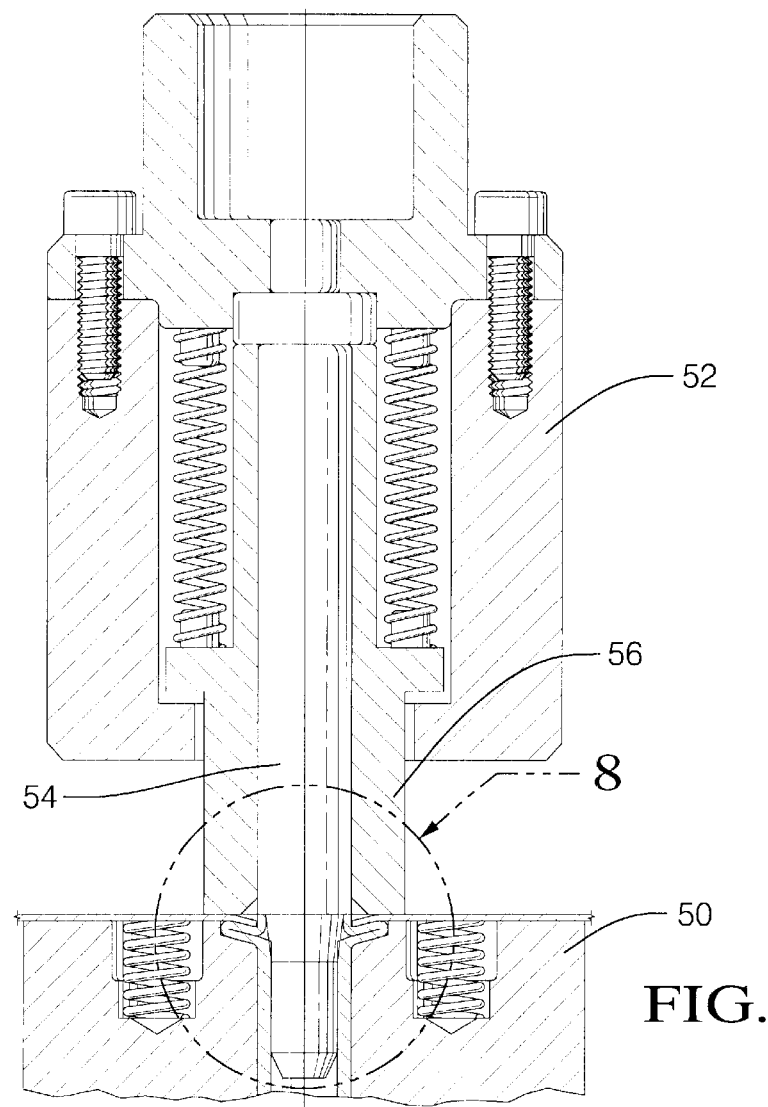
FIG. 7 is the embodiment of FIG. 3 showing the formation of the lip portion by the punch apparatus.
Figure 8:
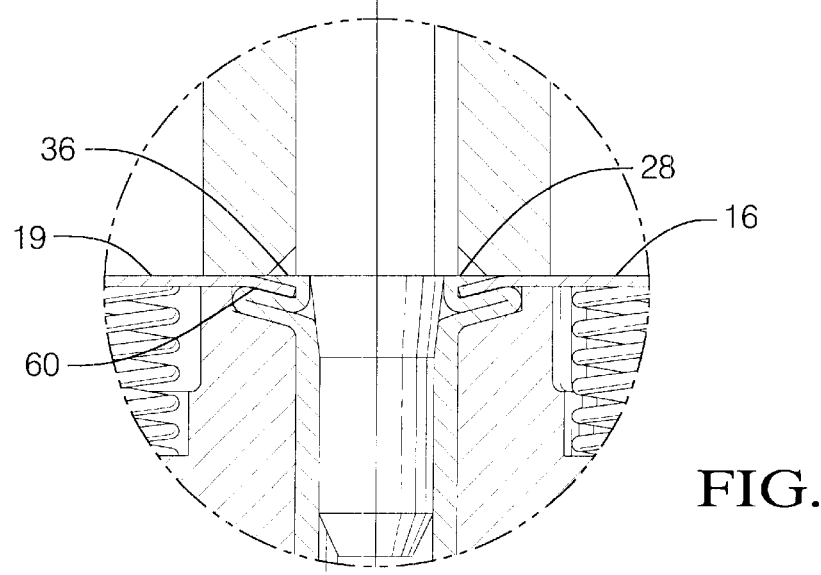
FIG. 8 is an enlarged view of the circled region C shown in FIG. 7.

As shown in FIGS. 7–8, inner punch 54 then applies a second force to the first end 28 of tube member 10. The end portion 36' (see FIG. 4) of first portion 32' is deformed to create lip portion 36, which extends outward from the outer surface 26 of tube member 10. Lip portion 36 contacts the outer surface 19 of first housing member 16 to create a seal between first housing member 16 and tube member 10. One advantage of this arrangement is that it greatly reduces the number of parts required to provide a positive seal between the first housing member 16 and the tube member 10. This in turn reduces the overall cost of the product. Moreover, tube member 10 can be attached to the first housing member 16 quickly and easily in one operation, thus eliminating the labor intensive and time consuming installation process associated with conventional multi-component systems. This arrangement also has the advantage of eliminating the additional parts (i.e. seal, O-ring, glue) and steps associated with conventional sealing techniques. In addition to the above, this arrangement, and in particular the tube member 10, provides a passageway to allow the passage of cables, electric wires, etc. through the housing 14.

Referring again to FIG. 4, first housing member 16 may include a flange portion 60. In the embodiment shown, for example, flange portion 60 is angled with respect to first housing member 16. As shown in FIG. 6, first collar portion 32 may preferably contact the flange portion 60. Similarly, as shown in FIG. 8, lip portion 36 may preferably contact flange portion 60.

Die block 50 and punch apparatus 52 shown in FIGS. 3–8 may also be used to form second collar portion 40 (shown in FIG. 1). In fact, second collar portion 40 is preferably formed simultaneously with the formation of the first collar portion 32 as the opposing forces required are exerted against each other. In particular, when force is applied to the first end 28 of tube member 10, the third portion 40' (see FIG. 2) of tube member 10 may be deformed to create second collar portion 40, which extends outward from the outer surface 26 of the tube member 10. As shown in FIG. 1, second collar portion 40 may preferably contact second housing member 18, and in particular the inner surface 44 of second housing member 18, to create a seal between tube member 10 and second housing member 18. Again, the advantage of this arrangement is that it reduces the number of parts and steps required to provide a positive seal between second housing member 18 and tube member 10, which in turn reduces the overall cost of the product.

FIGS. 3–8 illustrate a preferred embodiment of attaching the tube member 10 to the first housing member 16 by deforming tube member 10 and simultaneously attaching tube member 10 to first housing member 16. But it should be understood by those of ordinary skill in the art that tube member 10 may alternatively be deformed first, and then attached to the first housing member 16. For example, tube member 10 may be deformed into the desired shape. The deformed tube member 10 may then be positioned against first housing member 16 and may be attached to the first housing member by conventional crimping techniques.

Figure 9:
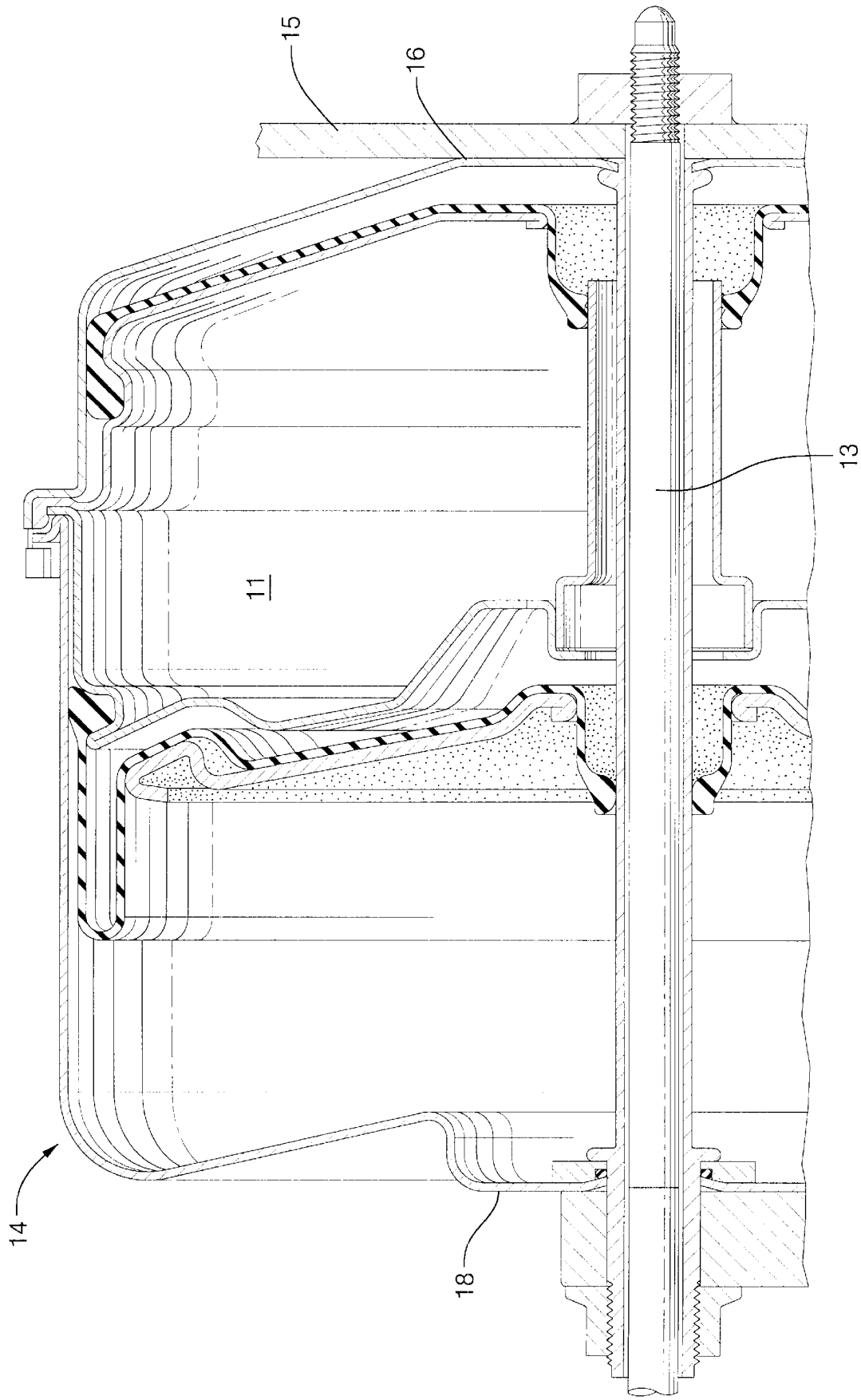
FIG. 9 is a partial sectional view of a vacuum brake booster including a connector apparatus according to the invention.
Figure 10:
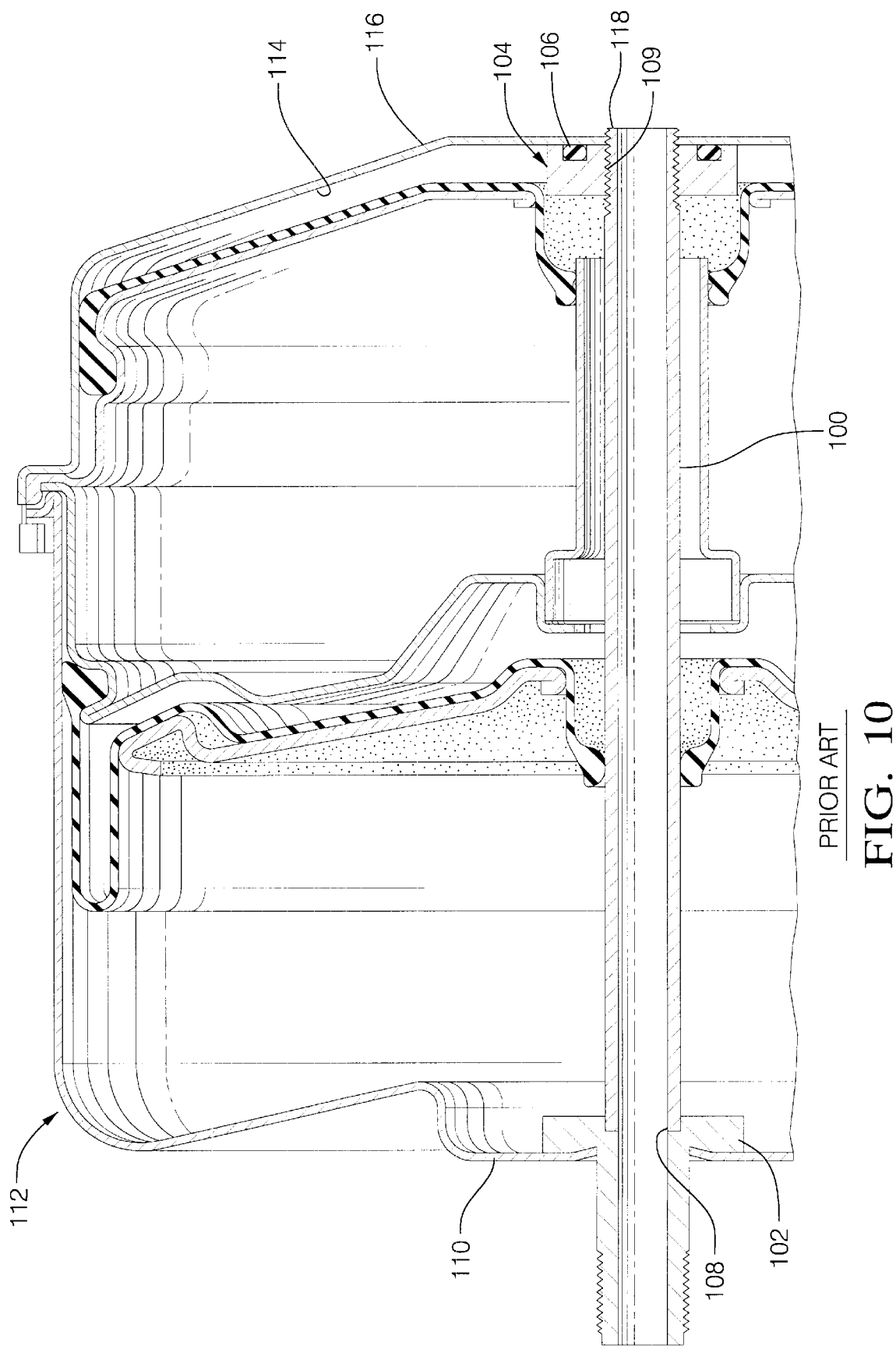
FIG. 10 is a sectional view of a known arrangement for attaching and sealing a tubular member to the housing of a vacuum brake booster.
Figure 11:
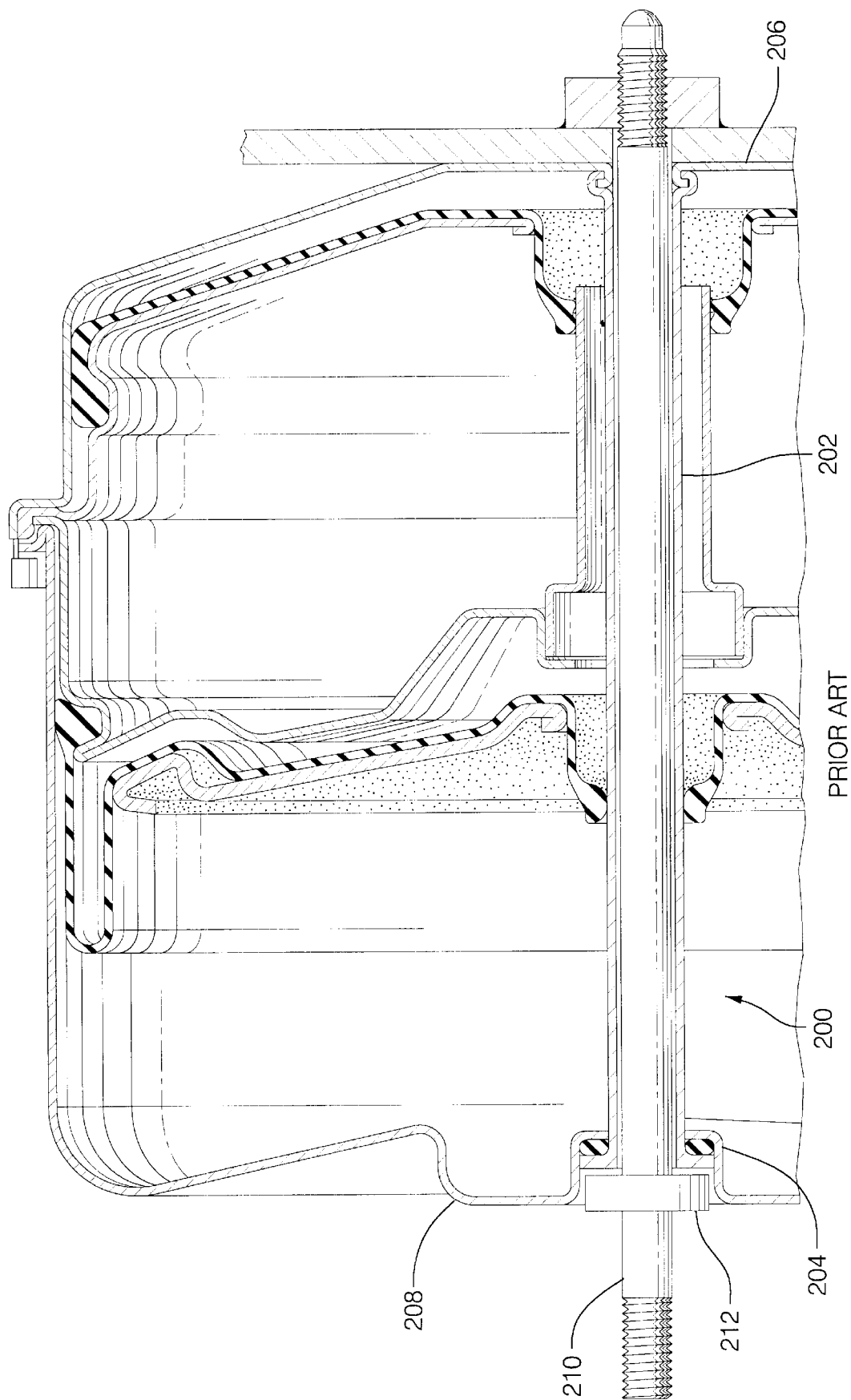
FIG. 11 is a sectional view of another known arrangement for attaching and sealing a tubular member to the housing of a vacuum brake booster.

FIG. 9 shows the assembled booster housing with tube member 10 and bolt 13 installed on the firewall 15 of a motor vehicle.

What is claimed is:

1. A connector apparatus attached to a housing of a vacuum brake booster comprising a tube member including a body portion, an outer surface, a first end, and a second end, a first collar portion between the first end and the body portion, the first collar portion extending outward from the outer surface, a lip portion at the first end and extending outward from the outer surface, the first collar portion and the lip portion defining a recess receiving a first housing member of the housing,
    wherein the tube member further includes a second collar portion spaced apart from the first collar portion, the second collar portion extending outward from the outer surface, the second collar portion defining a contact surface contacting an inner surface of a second housing member of the housing.

2. The apparatus of claim 1 wherein the second collar portion extends outward substantially perpendicular from the outer surface of the tube member.

3. A method of attaching a tube member to a housing of a vacuum brake booster comprising the steps of:
    providing a first housing member including an inner surface, an outer surface, and an opening formed therein, the tube member including an outer surface, a first end, a first portion, and a body portion, the first portion between the first end and the body portion;
    inserting the first end of the tube member through the opening in the first housing member;
    applying a force to the first end of the tube member;
    deforming the first portion to create a first collar portion extending outward from the outer surface;
    contacting the first collar portion against the inner surface of the first housing member;
    applying a second force to the first end of the tube member;
    deforming an end portion of the first portion to create a lip portion extending outward from the outer surface; and
    contacting the lip portion against the outer surface of the first housing member to create a seal between the first housing member and the tube member.

4. The method of claim 3 wherein the first collar portion is adjacent to the first end of the tube member.

5. The method of claim 3 wherein the first collar portion includes a body portion, the body portion of the first collar portion extending outward from the outer surface in a direction towards the first housing member.

6. The method of claim 3 wherein the first collar portion has a conical shape.

7. The method of claim 3 wherein the first portion includes a first wall thickness and the body portion includes a second wall thickness, the first wall thickness being less than the second wall thickness.

8. The method of claim 3 wherein:
    the first housing member further includes a flange portion;
    the step of contacting the first collar portion against the inner surface of the first housing member comprises contacting the first collar portion against the flange portion; and
    the step of contacting the lip portion against the outer surface of the first housing member comprises contacting the lip portion against the flange portion.

9. The method of claim 8 wherein the flange portion is angled with respect to the first housing member.

10. The method of claim 3 wherein the first housing member is a planar member.

11. The method of claim 3 wherein the tube member further includes a third portion, the third portion disposed between the body portion and a second end of the tube member and further comprising the steps of:
    deforming the third portion to create a second collar portion extending outward from the outer surface.

12. The method of claim 11 further comprising the steps of:
    contacting the second collar portion against a second housing member to create a seal between the tube member and the second housing member.

13. The method of claim 12 wherein the second housing member includes an inner surface and further comprising the steps of:
    contacting the second collar portion against the inner surface of the second housing member.

14. The method of claim 11 wherein the body portion includes a second wall thickness and the third portion includes a third wall thickness, the third wall thickness being less than the second wall thickness.

15. The method of claim 11 wherein the second collar portion extends outward substantially perpendicular from the outer surface of the tube member.

16. A connector apparatus for attaching to a housing of a vacuum brake booster comprising a tube member including a body portion, an outer surface, a first end, and a first portion for creating a collar portion extending outward from the outer surface, the first portion between the first end and the body portion, the first portion including an end portion for creating a lip portion extending outward from the outer surface,
    wherein the first portion includes a first wall thickness and the body portion includes a second wall thickness, the first wall thickness being less than the second wall thickness.

17. The apparatus of claim 16 wherein the third portion includes a third wall thickness, the third wall thickness being less than the second wall thickness.

18. A vacuum brake booster comprising:
a housing member including an outer surface and an opening formed therein, the housing member including a flange portion surrounding the opening, a tube member including a body portion, an outer surface, a first end, and a second end, a first collar portion between the first end and the body portion, the first collar portion extending outward from the outer surface of the tube member, a lip portion at the first end and extending outward from the outer surface of the tube member, the first collar portion and the lip portion defining a recess receiving the flange portion of the housing member.

19. The vacuum brake booster of claim 18 wherein the lip portion lies in a plane of the outer surface of the housing member that is adjacent to the flange portion.

20. The vacuum brake booster of claim 18 wherein the flange portion is bent inward from the outer surface of the housing member.

21. The vacuum brake booster of claim 18 wherein an inner surface of the lip portion contacts the flange portion.

22. The vacuum brake booster of claim 21 wherein an outer surface of the lip portion is flush with the outer surface of the housing member.

\* \* \* \* \*